United States Patent [19]

Defoor

[11] 4,039,498

[45] Aug. 2, 1977

[54] PROCESS FOR PREPARING AQUEOUS SOLUTIONS OF ACRYLAMIDE POLYMERS

[75] Inventor: Frans Maurice Joseph Defoor, Strombeek-Bever, Belgium

[73] Assignee: Labofina S.A., Brussels, Belgium

[21] Appl. No.: 565,125

[22] Filed: Apr. 4, 1975

[30] Foreign Application Priority Data

Apr. 4, 1974 South Africa .................... 74/2169

[51] Int. Cl.$^2$ ............................................. C08L 33/26
[52] U.S. Cl. ..................... 260/29.6 HN; 260/29.6 M; 260/29.6 Z; 260/29.6 N
[58] Field of Search ................. 260/29.6 HN, 29.6 M, 260/29.6 Z, 29.6 N, 89.7 R, 80.3 N; 526/78, 81, 216, 303

[56] References Cited

U.S. PATENT DOCUMENTS

| | | | |
|---|---|---|---|
| 2,813,088 | 11/1957 | Meinel | 260/89.7 R |
| 3,061,595 | 10/1962 | Dorion et al. | 260/89.7 R |
| 3,296,235 | 1/1967 | Zoebelein | 260/29.6 HN |
| 3,332,922 | 7/1967 | Hoover | 260/89.7 R |
| 3,620,991 | 11/1971 | Wasser | 260/29.6 Z |
| 3,651,002 | 3/1972 | Higashimura et al. | 260/29.6 HN |

FOREIGN PATENT DOCUMENTS 1,112,294 8/1961 Germany .................... 260/29.6 HN

*Primary Examiner*—M. J. Welsh

[57] ABSTRACT

Disclosed is a process for preparing an aqueous solution of an acrylamide polymer having an average molecular weight of from about 800,000 to 2,000,000 and having a viscosity between about 2,000 and 8,000 centipoise (at 25° C), comprising the steps of first initiating the polymerization of an aqueous solution of acrylamide-based monomer in the presence of a free-radical catalyst and an amine reducing agent and then adjusting the pH of the solution to a value between about 3 and 6.

12 Claims, No Drawings

PROCESS FOR PREPARING AQUEOUS SOLUTIONS OF ACRYLAMIDE POLYMERS

BACKGROUND OF THE INVENTION

The present invention relates to a process for preparing aqueous solutions of acrylamide polymers which are used to improve the constitution of soils.

In many parts of the world, large tracts of land remain sterile and arid because they do not absorb nor retain rain or irrigation water. This lack of moisture is an obstacle to the growth of plants and therefore these soils are easily eroded by wind and by rain.

Furthermore, when a valuable soil is cultivated for a number of years with no respect for its structure, the agricultural yield will decrease with time. This yield reduction results from intensive mechanical agricultural work with heavy farm machinery which compress the soil and damage its structure.

It has already been proposed to apply bituminous emulsion or polymeric compositions as continuous coatings or in strips in order to retain moisture in the soil and to prevent or restrict soil movements. However, this method does not modify the physical properties of the soil whose structure is not improved. In fact, this method is only applicable to previously seeded soils whose nature is such that they easily retain moisture.

Polymerizable mixtures containing acrylamide monomer as a main constituent, a cross-linking agent and a polymerization catalyst have been suggested as soil-stabilizing agents. These compositions are injected into the soils where they are polymerized. However, these mixtures are used to solidify and harden soft foundations in engineering work and in construction. They are not suitable for improving the structure of poor soils or for stabilizing the structure of good soils for agricultural purposes.

Other processes comprise the use of polyacrylamide solutions, instead of acrylamide solutions. The soils are treated with an aqueous solution of polyacrylamide and with an aqueous solution of cross-linking agent. The polymer is thus transformed into a hydrogel forming aggregates with the soil particles. However, the effectiveness of this method varies and depends on some factors; the results are not always reproducible.

SUMMARY OF THE INVENTION

An object of the present invention is to provide a method for producing polyacrylamide solutions which are easy to incorporate into the soils and which have the advantage of controllable gel times.

According to the present invention, aqueous solutions of polyacrylamides with an average molecular weight varying from about 800,000 to 2,000,000 (weight average) and having a viscosity comprised between 2,000 and 8,000 centipoise (measured at 25° C.) are prepared by a process which comprises first initiating the polymerization of an aqueous solution of acrylamide-based monomer in the presence of a free-radical catalyst and an amine reducing agent and then adjusting the pH of the solution at a value comprised between 3 and 6. The catalyst is employed preferably in an amount between about 0.05 to 5% by weight of the monomer and the reducing agent in an amount of between about 10 to 100% based on said catalyst. Also present in a preferred embodiment of the invention are a ferric compound preferably between about 0.01 and 5% by weight of the catalyst and an alkali metal in ammonium dithionite, preferably in an amount of between about 0.05 and 1% of the reaction mixture.

DETAILED DESCRIPTION OF PREFERRED EMBODIMENTS

Long term experiments in different areas, covering a wide range of soil compositions, have shown that the best results are obtained by the use of aqueous polyacrylamide solutions which fulfill two conditions, which however are somewhat contradictory:
polyacrylamide having a high molecular weight,
aqueous solution having a relatively low viscosity, comprised between about 2,000 and 8,000 centipoise.

A soil with a good structure for agricultural purposes should be composed of crumby aggregates of sufficient stability, in order to withstand erosion by wind or water, and of high sorptive capacity for retention of water, minerals and nutritious agents. When a soil is treated with a polymer, two mechanisms prevail in aggregate formation:

a. adhesion based mechanism by which macromolecules stick to the surface of the particles; this mechanism is encountered in sandy soil structuration, b. adsorption mechanism through polar interactions; it predominates in loam and clay soils.

Water soluble polyacrylamides, prepared according to the process of the present invention, are particularly efficient in soil restoration and soil stabilization. These soluble macromolecules are easily applied by conventional apparatus on and into the soil where they readily diffuse. Moreover, they are strongly adsorbed by the soil particles and stick to the surface of these particles.

The macromolecules are then cross-linked to convert the soluble polymer into a hydrogel. The cross-linking agent may be a low molecular weight aliphatic dialdehyde, such as malonic, succinic, glutaric dialdehyde or, more particularly, glyoxal. The amount of added dialdehyde is such that not more than 1 aldehyde group is present for 1 amide group of the polymer. Other suitable cross-linking agents are the hypochlorous and hypobromous salts of alkali metals or of alkaline-earth metals. The selection of this salt depends primarily on economic factors and sodium hypochlorite is preferably used. The weight ratio between the acrylamide polymer and active hypochlorite or hypobromite calculated on a dry basis is preferably from 10:1 to 20:1.

A stream of polyacrylamide solution may be mixed with a stream of cross-linking solution just before spraying on and into the soil, but the two streams may be used separately. Gelification of the polyamide macromolecules occurs in the presence of the cross-linking agent with formation of stable aggregates of soil particles.

The stability of a soil structure is evaluated with the stability index, as defined by Professor de Boodt in "Mededelingen van de landbouwhogeschool en de opzoeking-stations van de Staat te Gent" 1958, Deel XXIII, No. 2, pages 497–507. This index is the difference in millimeters of the mean diameter as determined between the stable aggregates of the same humidified soil. The more stable the aggregates, the smaller the stability index.

Clay soils have been treated with aqueous solutions of polyacrylamides, having different molecular weights, and with aqueous solutions of glyoxal. The index of stability varies and depends on the molecular weight of the polymer, as shown in Table I. In this table I, the dosage is the amount in parts by weight of polymer (on a dry basis) per 1000 parts by weight of dry soil.

TABLE I

| Dosage of Polymer: | | | |
|---|---|---|---|
| 0.5 | | 0.25 | |
| Molecular Weight | Stability Index | Molecular Weight | Stability Index |
| 125,000 | 1.20 | 125,000 | 1.34 |
| 500,000 | 0.41 | 500,000 | 0.49 |
| 900,000 | 0.29 | 900,000 | 0.31 |
| 2,000,000 | 0.27 | 2,000,000 | 0.27 |

Moreover, it has been observed that the gelification time of a polyacrylamide solution treated with glyoxal depends on the molecular weight of the polymer.

Experiments have been carried out at a temperature of 25° C. and with aqueous solutions containing 4% by weight of polyacrylamide. With a polymer having a mean molecular weight of about 1,000,000, the gelification time was 28 minutes whereas this time was only 14 minutes with a polymer having a molecular weight of 1,850,000.

According to these data, aqueous solutions of polyacrylamide having an average molecular weight generally comprised between 800,000 and 2,000,000 are particularly suitable to improve soil structures. The stability index and the gelification time are improved with these solutions of high molecular weight polymers.

However, solutions of polymers having a high molecular weight have some drawbacks. More particularly, the viscosity of these solutions may be so high that difficulties occur when the solutions are to be diluted, pumped or sprayed.

Experiments have shown that suitable aqueous solutions of polyacrylamide should have a viscosity comprised between about 2000 and 8000 centipoise (measured at 25° C.). That means that polyacrylamides having a molecular weight comprised between 800,000 and 2,000,000 have to be used in the form of aqueous solutions containing about 3 to 8% by weight of dry polymer. Concentrated and viscous aqueous solutions of polyacrylamide being not easily diluted, it is therefore required to directly prepare diluted solutions of polyacrylamide.

However, the production of diluted solutions of polyacrylamide has some drawbacks. The monomer concentration in the polymerization mixture is low and there is difficulty in preparing polymeric solutions which are free from monomer and, consequently, which are not phytotoxic. Moreover, freshly prepared aqueous solutions of polyacrylamides having the required viscosity undergo an aging with substantial increase of viscosity. The macromolecules react one with the other and not with the residual monomer.

In order to obviate these drawbacks, aqueous solutions of polyacrylamides are prepared according to the present invention by polymerizing aqueous solutions of acrylamide, or of a mixture of acrylamide and a lesser amount e.g., generally up to about 20% of total monomer of a compound copolymerizable therewith, in the presence of a free-radical catalyst, preferably a peroxide, and an amine reducing agent.

The aqueous solutions may contain from 3 to 8% by weight of acrylamide or of a mixture of acrylamide and a lesser amount of a copolymerizable unsaturated compound, such as N-methylol acrylamide, acrylic acid, methacrylic acid, and sodium acrylate. The terms "acrylamide polymer" or "polyacrylamide" used hereinabove and throughout the following description are to be understood to cover both the water-soluble homopolymers of acrylamide and the water-soluble copolymers containing less than 50% and generally less than 20% of a copolymerizable comonomer.

The polymerization is carried out by conventional free-radical polymerization techniques, in the presence of a free-radical generating catalyst, preferably a catalyst of the peroxide-type, such as hydrogen peroxide, 1-butyl hydroperoxide, cumyl hydroperoxide, ammonium persulfate, potassium persulfate or the like. Redox combinations are preferably used, in order to increase the polymerization rate. Redox systems comprise a peroxide catalyst and an amine reducing agent, for instance dimethylaminopropionitrile, N, N, N', N'-tetramethylethylenediamine, nitrilo-tris-propion-amide, dimethylamino-propionitrile, tetraethylenepentamine, diethylenetriamine and the like.

The peroxide-type catalyst is used in an amount which is generally comprised between 0.05 and 5% based on the weight of monomer, and more particularly between about 0.1 and 2% by weight. The amount of reducing agent may be varied between about 10 and 100% by weight based on the peroxide catalyst, and preferably is between about 50 and 100% by weight, most preferably between about 80 and 100% by weight thereof.

It has been found that the polymerization rate of the monomer is substantially increased when a ferric compound is added to the catalyst. Any ferric compound which will provide ferric ions in solution is satisfactory. As suitable ferric compounds, there may be mentioned, for example, ferric oxide, ferric sulphate, ferric nitrate and ferric chloride.

The amount of ferric compound to be used is suitably selected depending upon the working conditions such as amount of peroxide type catalyst and polymerization temperature, but usually the ferric compound is used in an amount of about 0.01 to 5% by weight based on the peroxide catalyst, more preferably between about 1 and 3%. By adding a ferric compound, it is possible to carry out the polymerization of acrylamide at temperatures as low as 5°- 25° C., without significant harm to the polymerization rate.

The practical consequence of this activity of the described catalyst is that the polymerization may be carried out at room temperature and may be performed on the site and not necessarily in an industrial plant. The process is therefore much less expensive because the transport of diluted aqueous solutions of polyacrylamide from the plant to the site is avoided.

However, molecular oxygen is detrimental to the polymerization and industrial practice is to employ physical means, such as sparging with an inert gas, to remove oxygen. Such means are generally not available on the site. In order to avoid the detrimental action of oxygen, the preferred process of this invention comprises adding a dithionite salt of an alkali metal or of ammonium to the reaction mixture, in an amount varying generally between about 0,05 and 1% by weight based on the reaction mixture, and more expecially between about 0.1 and 0.8% by weight.

It has furthermore been discovered that the viscosity of the aqueous solutions prepared by the above described process may be controlled without adverse effect on the polymerization yield by carrying out the polymerization, initially without addition of an acid, and then, by adding an acid to have a pH comprised between 3 and 6, and more particularly between about 4 and 5. The choice of the acid which is added to the reaction mixture in order to obtain these pH values depends on many factors, such as price, availability, corrosivity, toxicity. In general any acidic material is suitable. A low molecular weight carboxylic acid, such as a lower fatty acid, more particularly acetic acid, is preferably used. Generally, the acid is added about 10 to 20 minutes after the start of the polymerization. Complete reaction is typically achieved in from 1 to 3 hours, usually between 1 and 2 hours.

In fact, the viscosity of the polyacrylamide solution resulting from the polymerization may be regulated by varing the amount of peroxide-type catalyst and the pH of the reaction mixture.

By using the process of the present invention, it becomes possible to prepare, on the site, aqueous solutions of polyacrylamide containing less than 0.1% by weight of residual acrylamide. These solutions are not phytotoxic and consequently they do not require a further treatment to remove unconverted acrylamide. Moreover, the solutions of polyacrylamide prepared by this process have a viscosity which may be varied between about 2000 and 8000 centipoise and consequently they are easily sprayed or injected into a soil.

The following examples are given to illustrate the present invention, and they are not to be construed as limitations thereon.

EXAMPLE 1

To 5 l. of water are added with stirring 200 g. of acrylamide, 40 ml. of an aqueous solution containing 10% by weight of diethylenetetramine, 40 ml. of an aqueous solution containing 10% by weight of potassium persulfate, 0.5 g. of sodium dithionite and 2 ml. of an aqueous solution containing 0.2% by weight of $FeCl_3$.

The polymerizaton is carried out at 20° C. After 15 minutes, a part of the polymerization is withdrawn and then mixed with acetic acid in order to produce a pH of 4. After 100–120 minutes, the monomer is completely polymerized. The aqueous solution has a viscosity of 2,600 centipoises and a monomer content of 0.05% by weight (lower than the phytoxicity level which is about 0.1% by weight). The polymer has a mean molecular weight of 820,000. This polyacrylamide solution is allowed to stand at 20° C. for a period of 5 days. The viscosity is slightly increased and is 2,640 centipoise.

The other part of the polymerization mixture, which is free from acetic acid and has a pH of 8.4, gives a polymer solution with a monomer content of 0.42. Moreover, the viscosity of this solution is 3,200 centipoise and, after 1 day, increases to 11,800 centipoise.

EXAMPLE 2

Aqueous solutions are prepared by adding with stirring to 5.1. of water, 200 g. of acrylamide, 0.5 g. of ammonium dithionite, 2 ml. of an aqueous solution containing 0.2% by weight of $Fe(NO_3)_3$ varing amounts of an aqueous solution containing 10% by weight of diethylenetetramine and varying amounts of an aqueous solution containing 10% by weight of ammonium persulfate.

The polymerization is carried out at about 20° C. Acetic acid is added to the polymerization mixture after 15 minutes, in order to give a pH of 4.

The aqueous solution of polyacrylamide has the following characteristics:

| Amount of ammonium persulfate, in ml. | 10 | 15 | 25 | 30 |
|---|---|---|---|---|
| Amount of diethylenetetramine solution, in ml. | 10 | 15 | 25 | 30 |
| Viscosity of the polymer solution, in centipoise | 25,000 | 18,000 | 8,500 | 6,000 |
| Molecular weight of the polymer | 2,920,000 | 2,400,000 | 1,800,000 | 1,450,000 |

These experiments show that the higher the amount of peroxide catalyst, the lower is the molecular weight of the polymer. According to this Example, ammonium persulfate is preferably used in amounts of about 25 to 30 ml. (i.e., 1.25 to 1.50% of the weight of acrylamide) to obtain the most suitable polymers with a molecular weight which does not exceed about 2,000,000.

EXAMPLE 3

To 4 l. of water are added with stirring 140 g. of acrylamide and 20 g. of sodium methacrylate, 30 ml. of an aqueous solution containing 10% by weight of tetra-ethylpentamine, 30 ml. of an aqueous solution containing 10 % by weight of potassium persulfate, 0.4 g. of sodium dithionite and 2 ml. of an aqueous solution containing 0.2% by weight of $FeCl_3$.

The mixture is then divided into 4 equal parts and each part is polymerized at about 15° C. With one part, having a pH of 8.3, the polymerization is carried out in the absence of acetic acid. The other parts are polymerized in the presence of acetic acid, which is added in varying amounts about 15 minutes after the start of the polymerization.

The results are the following:

| pH: | 8.3 | 6 | 4.5 | 3.5 |
|---|---|---|---|---|
| Viscosity of the polyacrylamide solution (in centipoise) | 9,200 | 4,700 | 4,560 | 2,180 |
| Molecular weight of the polymer | 4,250,000 | 1,650,000 | 1,250,000 | 850,000 |
| Molecular weight of the polymer after 8 days | 7,200,000 | 2,250,000 | 1,300,000 | 850,000 |
| Viscosity after 8 days | 18,000 | 8,250 | 4,600 | 2,180 |

EXAMPLE 4

An aqueous solution containing:
4% of acrylamide
0.07% of diethylenetriamine
0.07% of potassium persulfate
0.01% of sodium dithionite
0.001% by weight of $FeCl_3$
(all of these percentages being by weight) is pre-polymerized at 15° C., during a period of about 15 minutes. Acetic acid is then added and the mixture having a pH of 4.5 is further polymerized during a period of 30 minutes.

The polyacrylamide solution, containing 0.06% of residual monomer, has a viscosity of 3,200 centipoise. The mean molecular weight of the polymer is 1,120,000.

This polymerization is carried out on the site and the solution of polyacrylamide is applied on the soil, in admixture with a 3% aqueous solution of glyoxal and with ammonia. The polymer solution is mixed with the glyoxal solution in a ratio of 1 ml. glyoxal to 1 l. of diluted polymer, and the mixed product is used in an amount corresponding to about 1 liter $m^2$. of soil.

The gelification time varied as a function of the amount of added ammonia. This gelification time is:

20 minutes at pH 9.9
25 minutes at pH 9.6
75 minutes at pH 9.0.

The average stability index of the treated soil is 0.48, whereas it is 2.42 before the above treatment.

EXAMPLE 5

A polymer solution, prepared as described in Example 4, is used in admixture with a 4% aqueous solution of sodium hypochlorite having a pH of 9.5. The polymer solution is mixed with a hypochlorite solution in a ratio of 5:1 and the mixed product is used in an amount corresponding to about 1.5 liters $m.^2$ of soil.

The stability index of the treated soil is 0.38, whereas it is 2.29 before treatment.

What is claimed is:

1. A process for preparing an aqueous solution of an acrylamide polymer by initiating the polymerization of an aqueous solution of acrylamide based monomer in the presence of a free radical catalyst and an amine reducing agent, the improvement which comprises carrying out the polymerization in the presence of a peroxide-type catalyst which is used in an amount of between about 0.05 and 5%, based on the weight of said monomer, and adjusting the pH of the solution to a value between about 3 and 6 by adding an acid about 10 to 20 minutes after the start of the polymerization to obtain an aqueous solution of an acrylamide polymer having an average molecular weight of from 800,000 to 2,000,000 and having a viscosity of between about 2,000 and 8,000 centipoises at 25° C.

2. The process according to claim 1, wherein the aqueous solution of acrylamide-based monomer contains from about 3 to 8% based on the weight of said monomer.

3. The process according to claim 1, wherein the peroxide is used in an amount comprised between about 0.1 and 2%.

4. The process according to claim 1, wherein the polymerization is carried out in the presence of a ferric compound in an amount of between about 0.01 and 5% by weight based on the free-radical catalyst.

5. The process according to claim 1, wherein the polymerization is carried out in the presence of air and of a dithionite salt of an alkali metal or of ammonium, which is added to the reaction in an amount of from about 0.05 to 1% by weight based on such mixture.

6. The process according to claim 1, wherein the pH of the polymerization solution is adjusted by adding an acid.

7. The process according to claim 6, wherein said acid is acetic acid.

8. The process according to claim 1, wherein said amine reducing agent is employed in an amount of between about 10 and 100% based upon the weight of said catalyst.

9. The process according to claim 1, wherein said free-radical catalyst is selected from the group consisting of hydrogen peroxide, 1-butyl hydroperoxide, cumyl hydroperoxide, ammonium persulfate and potassium persulfate.

10. The process according to claim 1, wherein said amine reducing agent is selected from the group consisting of dimethylaminopropionitrile, N, N, N', N'-tetramethylethylenediamine, nitrilo-tris-propionamide, tetraethylenepentamine, diethylenetriamine and the like.

11. The process according to claim 4, wherein said ferric compound is selected from the group consisting of ferric oxide, ferric sulphate, ferric nitrate and ferric chloride.

12. An aqueous solution of acrylamide polymer suitable for improving the constitution of soils prepared according to the process of claim 1.

* * * * *